United States Patent [19]

Collette

[11] Patent Number: 4,725,464
[45] Date of Patent: Feb. 16, 1988

[54] REFILLABLE POLYESTER BEVERAGE BOTTLE AND PREFORM FOR FORMING SAME

[75] Inventor: Wayne N. Collette, Merrimack, N.H.

[73] Assignee: Continental PET Technologies, Inc., Stamford, Conn.

[21] Appl. No.: 868,729

[22] Filed: May 30, 1986

[51] Int. Cl.$^4$ .......................... B65D 1/00; B65D 85/70
[52] U.S. Cl. .................................. 428/35; 428/542.8; 215/1 L
[58] Field of Search ............... 428/35, 542.8; 215/1 C

[56] References Cited

U.S. PATENT DOCUMENTS

| | | | |
|---|---|---|---|
| 3,934,743 | 1/1976 | McChesney et al. | 428/35 |
| 4,330,579 | 5/1982 | Ota et al. | 428/542.8 |
| 4,406,854 | 9/1983 | Yoshino | 428/542.8 |
| 4,463,056 | 7/1984 | Steele | 428/542.8 |
| 4,483,891 | 11/1984 | Cerny | 428/542.8 |
| 4,525,401 | 6/1985 | Pocock et al. | 428/35 |
| 4,576,843 | 3/1986 | Beck et al. | 428/542.8 |
| 4,615,925 | 10/1986 | Nilsson | 428/542.8 |

FOREIGN PATENT DOCUMENTS 1436468 3/1966 France ............... 428/542.8

*Primary Examiner*—John E. Kittle
*Assistant Examiner*—James J. Seidleck
*Attorney, Agent, or Firm*—Charles E. Brown

[57] ABSTRACT

A returnable/refillable container in the form of a blow molded polyester biaxially oriented bottle having a physical and structural relationship providing for the maintenance of aesthetic and functional viability over a minimum of twenty trips wherein each trip comprises (1) an empty state caustic wash followed by (2) contaminant inspection and product filling/capping, (3) warehouse storage, (4) distribution to wholesale and retail locations, and (5) purchase, use and empty storage by the consumer followed by return to a bottler. The container is obtained utilizing a specific preform configuration and reheat blow process wherein the sidewall of the resultant container has a percent crystallinity of 28–30 at a total preform draw ratio of 7–9/1. The container is formed utilizing recently developed process techniques to optimize strain induced sidewall crystallization.

10 Claims, 6 Drawing Figures

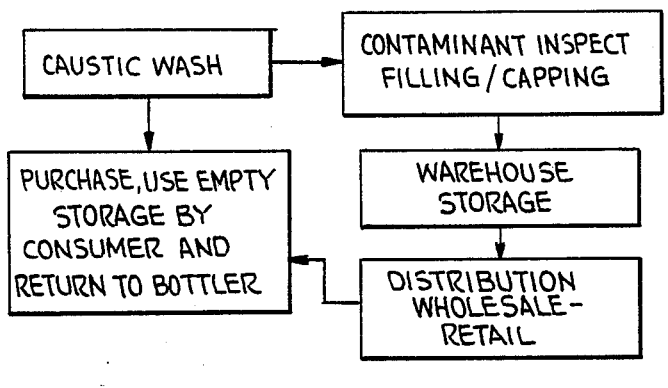
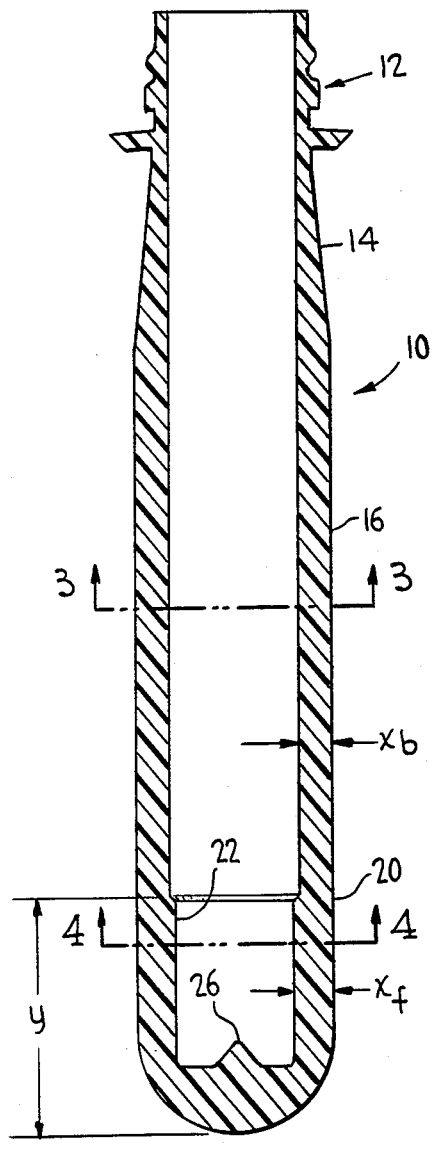
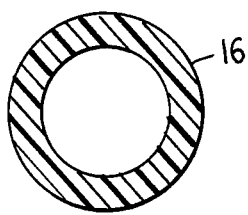
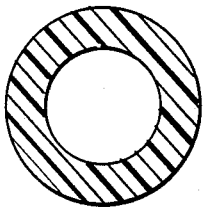
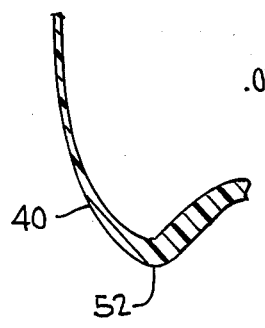
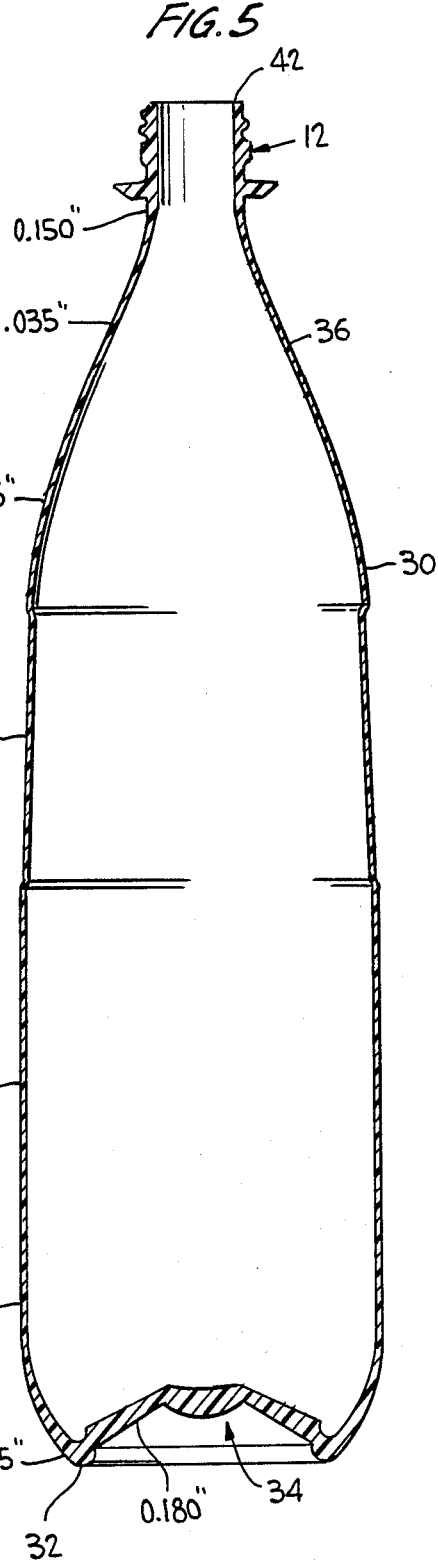

with 3.5% sodium hydroxide by weight with tap water. The wash solution was maintained at 140° F. and the bottles were submerged uncapped in the wash for 15 minutes to simulate the time/temperature conditions of a commercial bottle wash system.

After removal from the wash solution, the bottles were rinsed in tap water and then filled with a carbonated water solution at 4.0±0.2 atmospheres, capped and placed in a 100° F. convection oven at 50% RH for 24 hours. This elevated oven temperature was selected to simulate longer commercial storage periods at lower ambient temperatures. Upon removal from the oven, the containers were emptied and again subjected to the same wash/fill cycle until failure.

In addition, control bottles from the 0.84 intrinsic viscosity run were (1) exposed to twenty consecutive wash cycles for fifteen minues each with no pressure exposure between cycles and (2) others were exposed to twenty consecutive pressure fill and elevated temperature storage cycles with no caustic wash exposure between cycles. Results of such tests are tabulated below:

| IV | Cycles to Initial Failure | 10 Cycle % Volume Change | Average Final Perpendicularity (TIR) |
|---|---|---|---|
| 0.72 | 3 | −10.5 | 0.182 inch |
| 0.84 | 6 | −6.9 | 0.139 |
| 1.06 | 7 | −7.6 | 0.120 |
| 0.84 (Wash Only) | N/A | −16.8 | 0.020 |
| 0.84 (Pressure Only) | N/A | +8.9 | 0.135 |

A failure was defined as any crack propagating through the PET bottle wall which resulted in leakage and pressure loss. No cracks were seen in the 0.84 intrinsic viscosity bottles that were exposed only to caustic wash or pressure filled cycling. Bottles in each run exposed to a complete wash/pressure cycling failed in seven cycles or less.

Given the above, it was concluded that the caustic solution acts as a stress crack agent if, and only if, residual stresses were present in the PET bottles due to geometrical strains imparted to the polyester during the pressurization cycles.

All cracks initiated on the interior surface of the bottle and propagated through to the exterior wall. Several crack initiation mechanisms were noted: (1) radial cracks initiating at the base contact radius and propagating around the base; (2) radial cracks initiating on the interior surface of the structural reinforcing ribs and propagating around the base, and (3) axial cracks initiating opposite the preform injection gate and propagating axially through the bottle base. All failures occurred in the unoriented base area of the bottle (biaxial orientation as occurs in the bottle sidewalls significantly improves crack resistance). Axial crack initiation but not propagation was evident in the shoulder or neck transition area (from the unoriented to the oriented PET bottle sidewall).

It is to be understood that there is a certain degree of creep (i.e. non-elastic volume expansion over time) which occurs in PET bottles under internal pressure. Notwithstanding this, overall volume shrinkage due to 140° F. washing exceeded the filled 100° F. creep level and objectionable distortion in the shoulder transition area between the bottle body and the neck finish was evident on all bottles exposed to the elevated temperature caustic washing; as was the gradual "chalking" of the outside surface of the bottles. This chalking or whitening was most pronounced in the low orientation transition area between amorphous non-oriented and semi-crystalline oriented. From the foregoing, it can be concluded that bottles produced using presently commercially acceptable conventional non-returnable PET beverage bottle technology are unacceptable for multiple trip usage. The principal problems include 140° shrinkage in excess of the creep which occurs during the filled portion of a simulated commercial cycle and stress crack failures during the wash portion of the cycle.

At this time it is pointed out that the maximum permissible volume deviation is ±1.5% and crack failures of any type are unacceptable.

After much work, it was found that the crack problem could be greatly reduced by in lieu of providing a rib reinforced base, the reinforcing for the base be continuous. Accordingly, as is shown in FIG. 2, there has been provided a preform 10. The preform 10 has at its open upper end a molded threaded neck finish 12 and below the neck finish 12 the preform 10 is of a tapered increasing thickness in the area 14. The primary portion of the length of the preform 10 is in the form of a body portion 16 which is generally of a constant thickness and is annular in cross section as is shown in FIG. 3. Most particularly, a base portion 20 is provided with what is generally considered an internally thickened cylindrical base forming portion 22 which provides for a thickening of the base portion over that of the body portion 16. The thickened portion 22 extends down into the bottom 24 of the preform 10.

A change was also made in the resultant bottle 30 which is provided with a base which has a contact diameter radius 32. As is best shown in FIG. 6, the radius 32 was increased from 0.100 inch to 0.150 inch.

Preforms with the thickened portion 22 as opposed to the ribs were produced with 0.84 intrinsic viscosity PET and reheat blown to form a bottle such as, but different from the bottle 30 of FIG. 5, but with the increase in the critical contact diameter radius 32.

These bottles were subjected to consecutive wash/pressure cycles of the type disclosed above. No crack of the radial type described above occurred after ten cycles. Cracks of the axial type did initiate in the base 34 and shoulder 36 regions of the bottles after fifteen cycles, but no propagation failures were seen. On the other hand, total volume shrinkage approached 7.0%. Visible distortion was evident in the shoulder orientation-transition area and the bottles exhibited visible whitening due to caustic salt deposition.

This success led to the conclusion that commercially viable, refillable PET containers would be feasible if the container structure minimized geometry induced stress build-up during pressurization periods and if the shrinkage/distortion problem at 140° F. could be reduced to a level below ±1.5% volume change over twenty cycles.

At this time there has been developed technology which increases the thermal stability of PET containers through the application of product configuration and process control features to increase the percent crystallinity of the PET morphology in the blow molded containers.

REFILLABLE POLYESTER BEVERAGE BOTTLE AND PREFORM FOR FORMING SAME

This invention relates to new and useful improvements in plastic bottles, and more particularly to a plastic bottle which is refillable.

An economically and commercially viable, refillable plastic bottle would reduce the existing landfill and recycle problems associated with disposable plastic beverage bottles and more particulary with plastic beverage bottles formed of PET. In addition, a refillable bottle would permit the entry of the safer, lighter weight plastic containers into those markets, currently dominated by glass, where legislation prohibits use of non-returnable packages.

Technically, a refillable plastic bottle must remain aesthetically and functionally viable over a minimum of ten and preferably over twenty trips or loops to be considered economically feasible. A loop is comprised of (1) an empty caustic wash followed by (2) contaminant inspection and product filling/capping, (3) warehouse storage, (4) distribution to wholesale and retail locations and (5) purchase, use and empty storage by the consumer followed by eventual return to the bottler. To achieve viability, the plastic container must maintain a fill level volume variation of one and one half percent or less and resist breakage due to impact, burst and/or environmental stress crack failure over its useful life.

The ideal plastic refillable container must be clear and transparent to permit visual contaminant inspection prior to filling. In addition, the container should be of a one piece construction with an integral blow molded base member to eliminate visual inspection and other problems associated with two piece containers (i.e., two piece being defined as a blow molded body with a hemispherical closed end typically attached to an injection molded base cup where the base cup provides vertical stability).

At this point it is to be understood that several polymer candidates provide the clarity and physical properties deemed necessary to produce refillable plastic bottles and like containers. These polymers include polyethylene terephthalate (PET), acrylonitrile, polyarylate, polycarbonate, etc. Of the polymers commercially available, PET offers the best balance of properties and cost/performance ratios.

Non-returnable PET beverage containers are commercially produced for the most part by way of a two step process which involves the injection and/or extrusion molding of a preform followed by reheating of the preform, equilibration and stretch blow molding to the desired container geometry. Application of known beverage bottle technology for returnable PET containers does not yield acceptable performance results. In particular, containers produced by way of conventional preform and bottle design and process conversion techniques typically fail versus refillable performance specifications criteria after three to five trips or loops.

In accordance with the foregoing, it is the object of this invention to provide a thermoplastic PET container which retains its aesthetic and functional performance over ten to twenty complete refill trips or loops. It is a further object of this invention to provide a preform for forming such a container.

With the above and other objects in view that will hereinafter appear, the nature of the invention will be more clearly understood by reference to the following detailed description, the appended claims and the several views illustrated in the accompanying drawings.

FIG. 1 is a schematic showing the typical cycle or loop through which a refillable container must pass.

FIG. 2 is a vertical sectional view taken through a preform of a special configuration wherein the desired bottle structural characteristics may be obtained.

FIG. 3 is a fragmentary transverse sectional view taken generally along the line 3—3 of FIG. 2 and shows the general cross section of the preform.

FIG. 4 is a transverse horizontal sectional view taken generally along the line 4—4 of FIG. 2 and shows the cross section of the preform in a flute area.

FIG. 5 is a vertical sectional view taken through a typical refillable bottle formed in accordance with this invention.

FIG. 6 is an enlarged fragmentary sectional view showing specifically a desired lower body and base configuration.

It has been found that failure (via crack initiation and propagation) of biaxially oriented blow molded PET bottles and like containers exposed to caustic wash baths occurs primarily in the base area and most particularly in the central part of the base area which has little or no orientation. Further, in recent years there has been developed a method of increasing the structural integrity of the bottom structure of a blow molded plastic material container as is disclosed, for example, in U.S. Pat. No. 4,334,627 granted June 15, 1982. In accordance with this patent, the preforms are provided in the lower portion thereof, i.e. that portion which becomes the container base, with longitudinal ribs.

In addition, it has been found in recent years that the intrinsic viscosity of PET homopolymers is an important factor relative to reducing crack initiation and propagation problems.

With the foregoing as starting points, preforms of the type disclosed in U.S. Pat. No. 4,334,627 were produced by conventional molding techniques using PET hompolymers having intrinsic viscosities of 0.72, 0.85 and 1.06, respectively, as measured by ASTM D 2857 standards. More particularly, the preforms with a molded threaded neck finish, were circular in cross section, six inches in length below the neck finish and having an outside diameter of 1.125 inch at the mid body with an average wall thickness of 0.160 inch. This preform was utilized to form one liter bottles having a height below the neck finish of 10.0 inches, and a maximum diameter of 3.0 inches with a "champagne" push-up base.

Conventional process conditions were utilized, these conditions including:
Preform reheat time: 75 seconds
Blow time 2.5 seconds
Total mold cycle time: 6.5 seconds
Mold temperature: 40° F.

Reheat temperatures were adjusted to yield a 0.025 inch average wall thickness in the container body with a minimum preform temperature necessary to produce clear containers. Average preform temperatures, as measured in an isoparabolic drop calorimeter, were 185° F., 192° F. and 208° F. respectively for the 0.72, 0.84 and 1.06 intrinsic viscosity polymers.

Containers formed in accordance with the above program were subjected to the following simulated life cycle:

First of all, each container was subjected to a typical commercial caustic wash solution which was prepared Density as measured by ASTM test method #1505 is a useful measure of crystallinity as per:

$$\text{Percent crystallinity} = \frac{ds - da}{dc - da} \times 100$$

Where:
ds = sample density in gcm³
da = 1.333 gcm³ (amorphous)
dc = 1.455 gcm³ (100% crystalline).

Increasing the percent crystallinity in the container side wall reduces polymer molecular mobility and thus container shrinkage at a given temperature.

Typical prior art techniques to raise PET bottle sidewall crystallinity involve heat setting by blowing the container into a mold maintained at 300°–400° F. and subsequent internal cooling or transfer to a second cooling mold. Heat set crystalline levels typically exceed 28 to 32%.

The recently developed technology utilizes container design and process control techniques rather than typical heat set techniques to produce containers with a 26–28% crystallinity level and improved thermal stability (i.e. resistance to shrinkage at elevated temperatures) vs. that of containers produced by conventional non-returnable PET bottle technology.

In accordance with the aforementioned recently developed technology, the preform may be reheated on a conventional stretch blow molding machine equipped with a quartz IR reheat oven wherein the preform is heated to a temperature just prior to stretch blowing on the order of 225° F. to 245° F. The blow mold, however, is heated so that the blown container may be maintained at 175° to 250° F. for three to five seconds.

This newly developed technology was utilized in conjunction with a preform configured to yield an initial wall thickness of 0.200 inch and a final bottle wall thickness of 0.025 inch with a total preform draw ratio of eight to one. This preform had a weight of 93 grams and a length below the neck finish of 6.250 inches and a mid body diameter of 1.250 inches.

Further, the length of the tapered portion 14 of the preform was greatly increased which permits orientation of the shoulder area 36 to within 0.1 inch of the finish area for a generic 1.5 liter bottle configuration as is shown in FIG. 5.

Preforms were injection molded of 0.84 intrinsic viscosity PET homopolymer. The increased preform wall thickness over that of the previous preforms resulted in partial molecular recrystallization in the injection cavity. As such, the decrease in transparency (i.e. haze) in these preforms was measurably higher than in the originally discussed preforms as measured by ASTM D-1003 standards.

These preforms were heated to a temperature of 245° F. (the maximum achievable prior to the onset of surface crystallization). In addition, the blow mold temperature was increased to 180° F. to permit bottle annealing prior to removal from the blow mold. The finished bottles were subjected to twenty simulated wash/pressure trips. No radial stress crack failures were evident after twenty cycles. Several containers contained minor axial base cracks that initiated at the preform injection gate but did not propagate through the wall to permit pressure loss. Final volume change was −0.65% which is well within the ±1.5% fill level specification. On the other hand, final perpendicularity (TIR) averaged 0.225 inch vs. a target of 0.180 inch. Burst pressure exceeded 180 psi. However, 40% of the containers tested for 6', H₂O filled, ambient, 90° impact, failed.

Pressurized perpendicularity problems with one piece containers are typically associated with variations in wall thickness around the base contact or chime radius. Pressurized PET will creep over time particularly at elevated temperatures. Unoriented PET, as per the base area 34 of the container in FIG. 5 will creep more extensively than oriented PET. In addition, the extent of creep will increase with decreasing wall thickness.

To minimize the radial wall thickness variation, the injection gate must be accurately centered within the blow base. To accomplish perfect centering, the previously provided preform was modified to have a projection 26 on the inside closed end of the preform for engaging a recess in a tip of a stretch blow centering rod (not shown) which centering rod is customary. The centering rod in turn guides the preform accurately to the center of the blow base during the inflation process.

Drop impact failures in one piece champagne base configuration containers usually occur in the unoriented, amorphous area of the base due to the reduced strength of this area vs. the oriented sidewalls. Crack failures usually initiate in the chime area (radius 32) at the point of impact and propagate through the unoriented wall thickness. To minimize impact failure, the preform was modified so as to reduce the length of the flute thereby reducing the unoriented wall thickness in the base chime area (radius 32).

Finally, to reduce the incident of axial crack initiation during caustic wash cycling, the preform was modified to increase the wall thickness in the area of the injection gate, i.e. at the base of the preform generally identified by the numeral 24. It will be seen that this base portion is generally flat as opposed to the customary generally uniformed cross section.

Bottles were formed with this modified preform construction which is most specifically illustrated in FIG. 1 to form bottles of the configuration as is generally shown in FIG. 5 but with the base chime area 40 being of the configuration shown in FIG. 6 and with the radius 32 being 0.150 inch. These so formed bottles manufactured with the preform temperature and blow mold temperature and timing as discussed above were subjected to twenty consecutive caustic wash/pressure fill cycles. No axial or radial crack initiation was evident. All containers were within the ±1.5% volume specification after twenty cycles. Perpendicularity (TIR) averaged 0.085 inches with no individual bottle being above 0.150 inch. Caustic salt build-up on the containers resulted in some surface whitening. However, the residue was easily removed by manual scrubbing.

At this time, it is pointed out that the resultant containers can be further improved by additional known commercial processes. For example, a commercially available polymer coating may be applied to the refillable container to minimize scuffing/scratching over the useful life period and to eliminate whitening of the container surface over repeated caustic wash cycles. Also, there may be applied commercially available preform thread finish crystallization techniques to increase the modulus of the finish as required to minimize damage to the critical top sealing radius 42 of the bottle as shown in FIG. 5.

The preform may also be formed of a multilayer construction including internal barrier layers so as to extend shelf life. The application of such multilayer preforms may be utilized to reduce contaminant absorption (if filled with non-food products) and subsequent product contamination after washing and refilling.

Although an acceptable container was at hand, it was decided to expore the effect of higher sidewall crystallinity levels. Bottles of the type described above were produced under identical conditions except that the blow mold temperature was increased to 350° F. and internal cooling was introduced into the bottle prior to removing the heat set bottle from the blow mold. Percent crystallinity was calculated via sidewall density measurements at 31.5.

The containers formed in accordance with the above were cycled through the caustic wash/pressure pack test and 60% of the samples failed by way of axial and radial sidewall cracks in less than twenty cycles. While physical measurements indicated excellent dimensional stability, it was concluded that excessive sidewall crystallization beyond 28–30% raises the modulus of the biaxially oriented PET matrix to the point where repeated expansion/contraction cycling causes a semirigid morphology to fail.

Under the circumstances, it is believed that 28–30% crystallinity is an optimum level for a refillable PET container which is preferably in the form of a bottle having an injection molded threaded neck finish.

In order that the details of the resultant bottle may be fully appreciated by one skilled in the art, in FIG. 5 there has been applied to the bottle drawing the dimensions of the wall thickness at various points in the bottle.

Although only a preferred embodiment of the refillable PET plastic bottle and the preform from which it is formed has been specifically set forth herein, it is to be understood that minor variations may be made in either the bottle or the preform without departing from the spirit and scope of the invention.

I claim:

1. A preform for use in blow molding a container suitable for refilling, said preform being an injection molded member formed of a polyester, said preform having an elongated body for forming a container body and being closed at one end and open at the opposite end, said preform open end having a threaded neck finish with said preform between said threaded neck finish and said elongated body having a portion tapering in wall thickness for forming a container shoulder portion, said closed one end being defined by a bottom having a generally hemispherical outer surface, and between said closed one end and said preform body there being a cylindrical container base forming thickened portion of an increased wall thickness as compared to the wall thickness of said preform body.

2. A preform according to claim 1 wherein said bottom includes an inner centrally located axially projecting projection defining centering means for engagement by a centering rod during blow molding of said preform.

3. A preform according to claim 1 wherein said preform bottom has a generally flat transversely extending interior surface.

4. A preform according to claim 1 wherein said preform body has a wall thickness 7 to 9 times the thickness of a resultant container body thickness.

5. A preform according to claim 1 wherein said preform body has a wall thickness 7 to 9 times the thickness of a resultant container body thickness, and an outside diameter of 34 to 37% of the outside diameter of a resultant container body.

6. A preform according to claim 1 wherein said preform body has an outside diameter of 34 to 37% of the outside diameter of a resultant container body.

7. A preform according to claim 1 wherein said thickened portion has a length including said preform bottom which is 0.35 to 0.45 times a resultant container body diameter.

8. A preform according to claim 1 wherein said thickened portion has a length including said preform bottom which is 0.35 to 0.45 times a resultant container body diameter and a wall thickness of 1.1 to 1.25 times the wall thickness of said preform body.

9. A preform according to claim 1 wherein said thickened portion has a wall thickness of 1.1 to 1.25 times the wall thickness of said preform body.

10. A preform according to claim 1 wherein said preform is formed of 0.72 to 0.84 intrinsic viscosity PET homopolymer or copolymer.

* * * * *